（12）United States Patent
Brown et al.

(10) Patent No.: US 9,304,024 B2
(45) Date of Patent: Apr. 5, 2016

(54) ACOUSTIC FLOW MEASUREMENT DEVICE INCLUDING A PLURALITY OF CHORDAL PLANES EACH HAVING A PLURALITY OF AXIAL VELOCITY MEASUREMENTS USING TRANSDUCER PAIRS

(71) Applicants: Gregor J. Brown, Scotland (GB); Donald R. Augenstein, Pittsburgh, PA (US)

(72) Inventors: Gregor J. Brown, Scotland (GB); Donald R. Augenstein, Pittsburgh, PA (US)

(73) Assignee: Cameron International Corporation, Houston, TX (US)

( * ) Notice: Subject to any disclaimer, the term of this patent is extended or adjusted under 35 U.S.C. 154(b) by 130 days.

(21) Appl. No.: 14/153,809

(22) Filed: Jan. 13, 2014

(65) Prior Publication Data
US 2015/0198470 A1 Jul. 16, 2015

(51) Int. Cl.
*G01F 1/66* (2006.01)
*G01F 25/00* (2006.01)

(52) U.S. Cl.
CPC ............ *G01F 1/667* (2013.01); *G01F 25/0007* (2013.01)

(58) Field of Classification Search
None
See application file for complete search history.

(56) References Cited

U.S. PATENT DOCUMENTS

| | | | |
|---|---|---|---|
| 4,162,630 A * | 7/1979 | Johnson | 73/861.27 |
| 4,432,243 A * | 2/1984 | Lowell et al. | 73/861.31 |
| 4,462,261 A * | 7/1984 | Keyes et al. | 73/861.02 |
| 6,089,104 A * | 7/2000 | Chang | 73/861.27 |
| 2004/0011141 A1 * | 1/2004 | Lynnworth | 73/861.27 |
| 2007/0136008 A1 * | 6/2007 | Liu et al. | 702/45 |
| 2008/0276723 A1 * | 11/2008 | Gysling | 73/861.04 |
| 2012/0125121 A1 * | 5/2012 | Gottlieb et al. | 73/861.28 |

* cited by examiner

Primary Examiner — Harshad R Patel
(74) Attorney, Agent, or Firm — Ansel M. Schwartz

(57) ABSTRACT

A self-checking ultrasonic flow meter for measuring fluid flow in a conduit which includes a plurality of transducers engaged with the conduit. The flow meter includes a signal processor in electrical communication with the transducers which produces a measurement of flow rate and an associated estimate of uncertainty due to changes that have affected the accuracy of the measured flow rate. The transducers form multiple transducer pairs positioned to form acoustic transmission paths that are co-located in two or more chordal measurement planes. A plurality of axial velocity measurements are made in each chordal plane. A method for measuring fluid flow in a conduit with an ultrasonic flow meter.

18 Claims, 7 Drawing Sheets

ACOUSTIC FLOW MEASUREMENT DEVICE INCLUDING A PLURALITY OF CHORDAL PLANES EACH HAVING A PLURALITY OF AXIAL VELOCITY MEASUREMENTS USING TRANSDUCER PAIRS

FIELD OF THE INVENTION

The present invention is related to a self-checking flow meter based on the principles of ultrasonic transit time measurement. The flow meter therefore outputs a measurement of flow rate and an associated estimate of uncertainty due to changes that may have affected the accuracy of the measurement system. In particular, the invention enables verification of the axial velocity in each chordal measurement plane of the flow meter. This technique enables accurate self-verification to be carried out in the presence of complex non-axial flows including asymmetric rotational flows, and in case of a discrepancy allows identification of the chordal measurement plane or planes that have contributed to the discrepancy. It also uniquely allows identification of common-mode errors due to contamination based on the measurements in individual chordal measurement planes. (As used herein, references to the "present invention" or "invention" relate to exemplary embodiments and not necessarily to every embodiment encompassed by the appended claims.)

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Transit time ultrasonic flow meters are capable of high accuracy performance over a wide range of application conditions. This has led to their adoption in applications such as custody transfer of hydrocarbons, and measurement of nuclear feedwater flows.

To achieve high accuracy it is common for transit time ultrasonic flow meters to employ multiple pairs of transducers to infer velocity on a number of discrete paths. The velocity measurements can then be combined, along with information on geometry, to produce a measure of volumetric flowrate.

Two features of ultrasonic meters are particularly attractive in many applications. Firstly, they can be designed to be non-intrusive, that is to present no blockage to the flow, and consequently produce insignificant pressure loss. Secondly, their self-diagnostic capabilities are attractive in applications where routine in-situ calibration is difficult for practical or cost reasons.

Currently the self-diagnostic capabilities of transit time ultrasonic meters are based on evaluation of parameters such as amplifier gain, signal-to-noise ratios, and velocity profile descriptors such as flatness, asymmetry and swirl [Peterson, S, Lightbody, C, Trail, J and Coughlan, L (2008) On-line condition based monitoring of gas USM's, Proceedings of the North Sea Flow Measurement Workshop, Scotland, October 2008; Kneisley, G, Lansing, J, Dietz, T (2009) Ultrasonic meter condition based monitoring—a fully automated solution, Proceedings of the North Sea Flow Measurement Workshop, Norway, October 2009.]. However, as these parameters are difficult to relate directly to the uncertainty of the flow measurement, the use of meter diagnostics alone is not presently regarded as sufficient as a means of flow meter verification. For example, in the UK the Measurement Guidelines of the offshore oil and gas measurement regulator, while recognizing the benefits of current diagnostic techniques, note that they have the disadvantage that "diagnostic facilities are presently qualitative, rather than quantitative" [Department of Trade and Industry, Licensing and Consents Unit, Guidance Notes for Petroleum Measurement Under the Petroleum (Production) Regulations, December 2003, Issue 7.]. In order to overcome this limitation, sometimes two flow meters are installed in series, i.e. with one a short distance downstream of the other. This allows the volumetric flowrates from the two flow meters to be compared with one another, with the result that the verification is quantitative, rather than qualitative. Taking this concept a step further, it has also been known to calculate two independent flow rate measurements using two independent subsets of transducers installed in a single meter body.

One example of such a meter design is the combination of a 4-path meter and a single path meter [Kneisley, G, Lansing, J, Dietz, T (2009) Ultrasonic meter condition based monitoring—a fully automated solution, Proceedings of the North Sea Flow Measurement Workshop, Norway, October 2009], as illustrated in FIG. 1. A disadvantage of this design is that the single path meter is much more sensitive to distortions of the flow velocity field than the 4-path meter. This difference in sensitivity means that when a difference is detected, there exists the possibility that the single path meter can be affected by a distortion of the flow field that has a negligible effect on the 4-path meter. In the case where the four path meter is used as the primary measurement, this could result in false alarms, i.e. the difference detected does not reflect a reduction in accuracy of the 4-path meter. For example, in the referenced paper it is shown that when a flow conditioner upstream of the meter has one hole become blocked, there is virtually no effect on the 4-path meter, whereas the effect on the single-path meter can be greater than 0.85%. If, for example, an alarm threshold of 0.5% was set for the difference between the 4-path and single path result, the outcome would be an alarm annunciation where in fact the 4-path meter is continuing to read accurately.

Other examples of this concept include using two similar but separate groups of ultrasonic paths, such as shown in FIGS. 2a, 2b, 3a and 3b. FIGS. 2a and 2b show an arrangement of eight paths where one set of four paths are all set at a first angle relative to the pipe axis and the second set of four paths are all set at the negative value of that angle, such that the paths form a symmetrical X about the pipe axis when viewed from above. In this example the first set of four paths would be 1, 2, 3 and 4 and the second set 5, 6, 7 and 8. In FIG. 3 an alternative arrangement is used whereby each independent set of four paths has paths selected alternately relative to the pipe axis. In FIGS. 3a and 3b, the first set of four paths would be A1, B1, C1 and D1 and the second set A2, B2, C2 and D2. However, both of the arrangements shown suffer from a common weakness in that each group of four paths will still be affected differently by distortions of the flow velocity field, particularly when complex non-axial flow fields such as asymmetric rotational are present. What will happen in such a case is that one group of four paths will produce a result that will overestimate the flow rate, whilst the other group will underestimate the flow rate. Whilst this has some use in diagnosing flow conditions, it complicates the process of meter verification, as it is difficult to distinguish between an error in the measurement system itself and a difference that is created by the flow velocity field.

This limitation can be reduced in magnitude by use of a mechanical flow conditioning element installed upstream of the flow meter is employed to reduce the transverse flow components, but this negates the benefits of a non-intrusive meter design.

A further disadvantage of the concept using two similar groups of ultrasonic paths such as shown in FIGS. 2a, 2b, 3a and 3b is that even when a flow conditioner is used, some problems may be difficult to detect or quantify. If, for example, a uniform buildup of contamination inside the meter body was to occur, then the output from each set of four paths would be affected equally, and detection of the problem would have to rely on qualitative diagnostics such as amplifier gain, velocity profile shape or comparison of sound velocities, as there would be no indicated difference in flow rates.

BRIEF SUMMARY OF THE INVENTION

The present invention is a self-checking ultrasonic flow meter that provides an output of flow rate plus an associated estimate of uncertainty due to changes that could have affected the accuracy of the measurement system. One aim of the invention is to ensure that the estimate of uncertainty is not affected by asymmetric rotational flows, therefore eliminating the need for mechanical flow conditioning. This is achieved by arranging transducers such that redundant measurements of axial velocity can be made in each chordal measurement plane of the flow meter, i.e. multiple axial measurements are made in each chordal plane in such a way that they are substantially independent of the effects of non-axial or transverse flow. This dictates that there should be a minimum of six nodes in each chordal measurement plane, where each node is either a single transducer or a single reflection point. The compound axial velocity measurements in each measurement plane are then used in the computation of the flow rate, and comparison of individual in-plane axial velocity measurements used in the assessment of the uncertainty. Another aim of the invention is to be able to detect path angle and path length changes that would result from contamination build up inside the meter body, and to be able to do this for each chordal plane without reference to the data from another chordal plane. To that end, the velocity measurements within each chordal plane are made using pairs of transducers arranged such that one path has a path length divided by a cosine of the angle relative to the conduit axis that is different from another path in that same plane. Combining these constraints the flow meter would have transducers forming a minimum of three traverses in each chordal plane, at least one path having a path length or path angle that is different to the others in that plane.

BRIEF DESCRIPTION OF THE SEVERAL VIEWS OF THE DRAWING

In the accompanying drawings, the preferred embodiment of the invention and preferred methods of practicing the invention are illustrated in which:

FIG. 10a shows three direct paths in a single chordal plane with one transducer that is shared by all three paths. FIG. 10b shows two reflected paths with one transducer that is shared by both paths. FIG. 10c shows two reflected paths with a reflector that is shared by both paths. FIG. 10d shows two direct paths and one reflected path with one transducer that is shared by two paths and with a combined transducer/reflector that is another shared node. FIG. 10e shows two direct paths and one reflected path with three transducers that are each shared by two paths. FIG. 10f shows two direct paths and one reflected path with two transducers that are each shared by two paths and a combined transducer/reflector that is a node that is shared by all three paths.

DETAILED DESCRIPTION OF THE INVENTION

Figure 1:
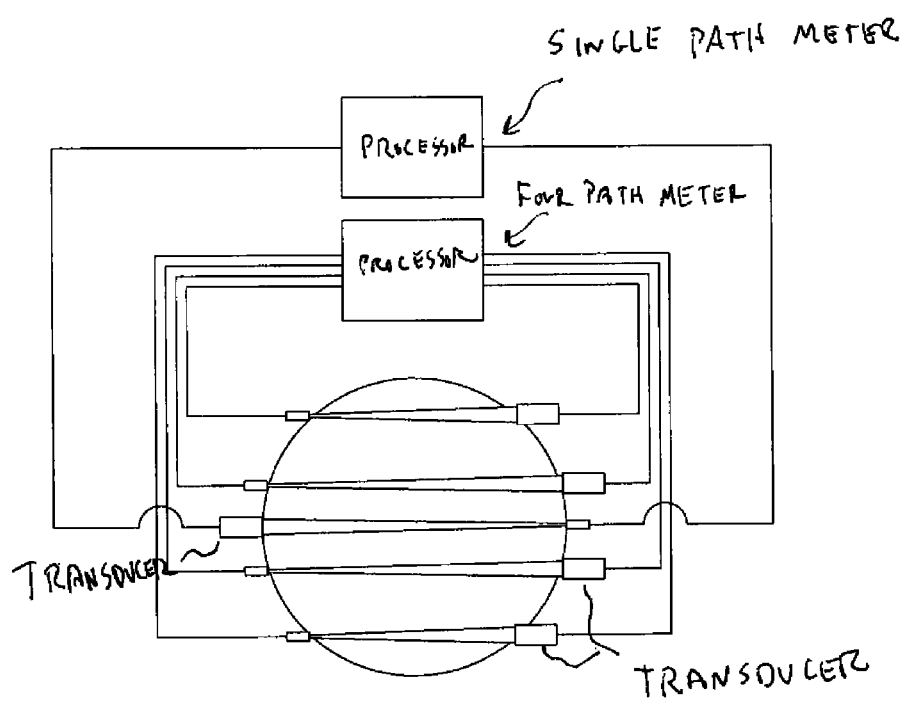
FIG. 1 shows a combination of a 4-path and a single-path meter in one body of the prior art.
Figure 2A:
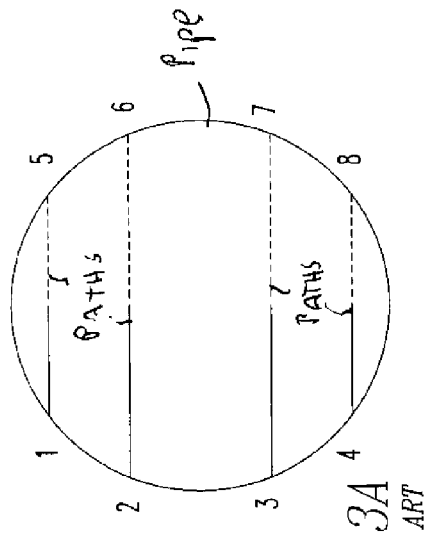
FIGS. 2a and 2b, and 3a and 3b show two different combinations of 4-path meters in one body of the prior art.
Figure 3A:
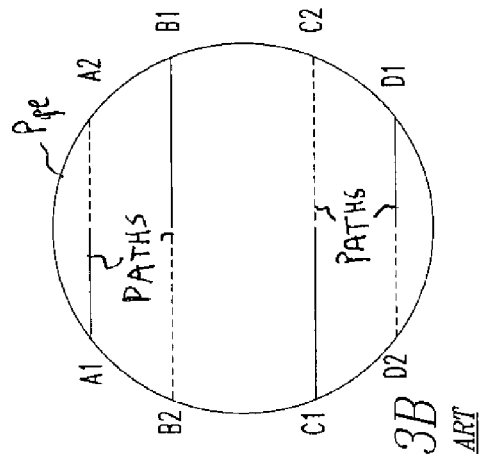
Figure 2B:
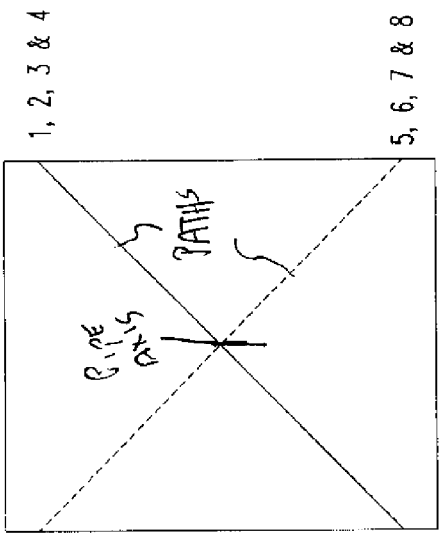
Figure 3B:
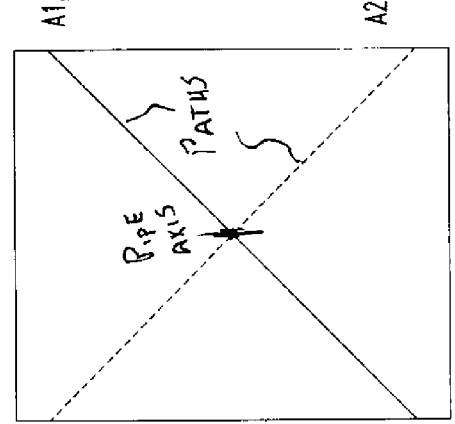

Referring now to the drawings wherein like reference numerals refer to similar or identical parts throughout the several views, and more specifically to FIGS. 4, 5a, 5b, 6, 7a and 7b thereof, there is shown an ultrasonic flow meter 10 for measuring fluid flow in a conduit 26. The flow meter 10 comprises multiple transducer pairs 12 positioned to form acoustic transmission paths 14 that are co-located in two or more chordal measurement planes 16, each plane having length to width ratio of less than 2.5. In each chordal measurement plane the transducer pairs 12 located in the chordal measurement plane are positioned to form acoustic transmission paths 14 that traverse at least once from one side 18 of the plane to another side 20 of the plane. if all paths 14 are direct from one transducer 22 to another transducer 22 of a transducer pair, there is a minimum of three traverses in each chordal plane and if any paths 14 employ a reflection point 28, there is a minimum of four traverses such that in either case a sum of the number of paths 14 and the number of traverses in each chordal plane is greater than or equal to six. The flow meter 10 has a signal processor 30 to cause the transducers 22 to produce the necessary signals and to receive the signals produced by the transducers 22 and perform the necessary signal processing and computations. Such a signal processor 30 would be similar to those currently produced by Cameron International for the Caldon LEFM series of flowmeters.

Figure 6:
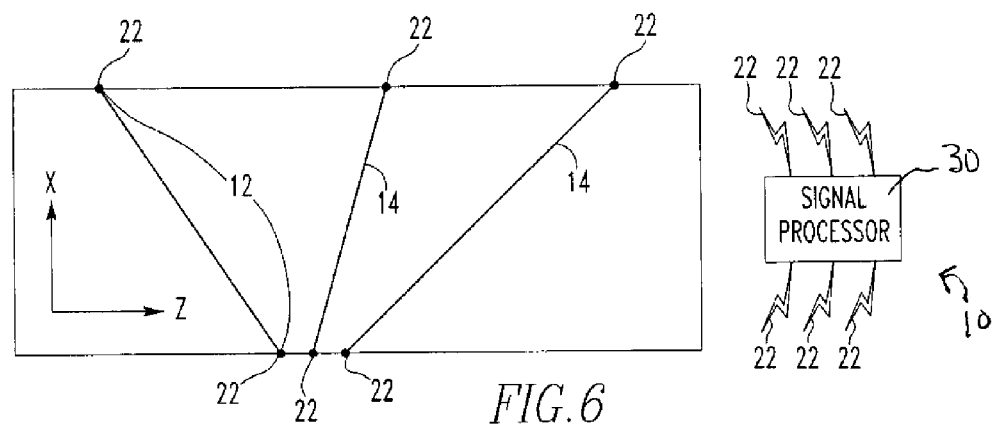
FIG. 6 shows three direct paths in a single chordal plane.
Figure 7A:
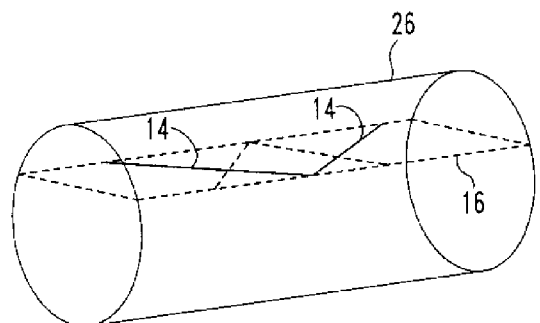
FIGS. 7a and 7b show an arrangement of transducers and reflectors in one chordal plane according to one embodiment of the invention.
Figure 7B:
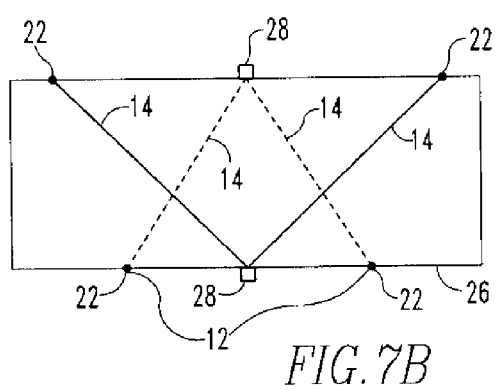
Figure 9A:
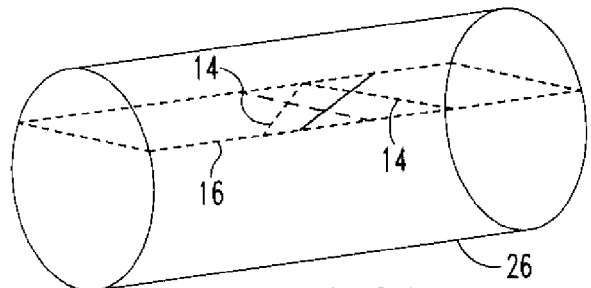
FIGS. 9a and 9b show an arrangement of transducers and reflectors forming two direct paths and one reflected path in one chordal plane according to the invention.
Figure 9B:
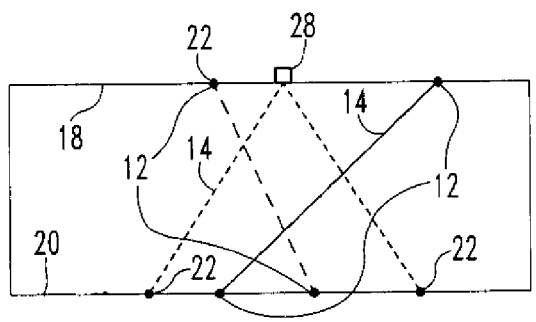

The ultrasonic flow meter 10 may have three paths 14 per chordal plane and transmission is on a direct path between individual transducers 22, as shown in FIG. 6. The ultrasonic flow meter 10 may have two paths 14 per chordal plane, each path being a reflected path with two traverses of the chordal plane and one reflection in each of the two paths 14, as shown in FIGS. 7a and 7b. The ultrasonic flow meter 10 may have three paths 14 per chordal plane and transmission on two paths 14 is direct between transducers 22, and one path is a reflected path with two traverses of the chordal plane and one reflection point, as shown in FIGS. 9a and 9b.

The present invention pertains to an ultrasonic flow meter 10 for measuring fluid flow in a conduit 26, as shown in FIGS.

6 and 11. The flow meter 10 comprises multiple transducer pairs 12 positioned to form paths 14 that are co-located in two or more chordal measurement planes 16 of the conduit 26. In each chordal measurement plane transducers 22 of the transducer pairs 12 are positioned to form acoustic paths 14 that traverse at least once from one side 18 of the plane to another; at least one path has a different path length or angle relative to the other paths 14 in that particular chordal plane, such that a path length divided by a cosine of the angle relative to the conduit 26 axis is different from another path in that same plane.

Figure 11:
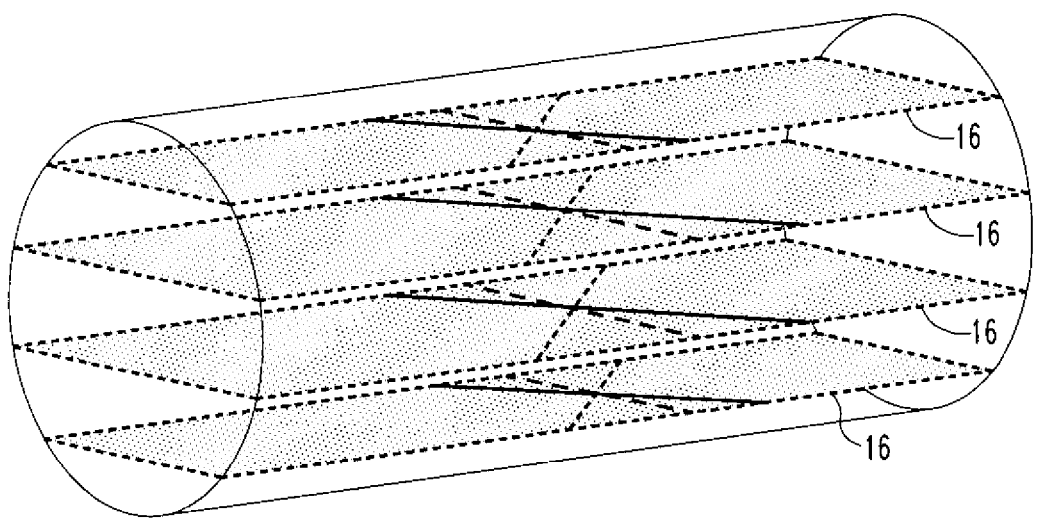
FIG. 11 shows a meter with four chordal planes.

The present invention pertains to an ultrasonic flow meter 10 for measuring fluid flow in a conduit 26, as shown in FIGS. 6 and 11. The flow meter 10 comprises multiple transducer pairs 12 positioned to form paths 14 that are co-located in two or more chordal measurement planes 16 of the conduit 26, such that the paths 14 form a minimum of three traverses in each chordal measurement plane.

The ultrasonic flow meter 10 may have three direct paths 14 per chordal plane whereby a first pair of paths 14 (A and B) are used in the computation of an axial velocity measurement in the plane, and a second in-plane axial velocity measurement is made using one of the paths belonging to that first pair of paths and a third path such that the second pair of paths is defined as A plus C or B plus C.

The ultrasonic flow meter 10 may have three direct paths 14 per chordal plane whereby two in-plane axial velocity measurements are made in each plane according to equations:

$$v_{axialAB} = \frac{\left(v_B - v_A \frac{Z_A X_B}{X_A Z_B}\right)}{\left(1 - \frac{Z_A X_B}{X_A Z_B}\right)}$$

$$v_{axialBC} = \frac{\left(v_C - v_B \frac{Z_B X_C}{X_B Z_C}\right)}{\left(1 - \frac{Z_B X_C}{X_B Z_C}\right)}$$

Other presentations of these equations are possible; therefore it is solution of simultaneous equations to eliminate the transverse velocity in the solution that is important, not the specific form of the final equation used.

The present invention pertains to an ultrasonic flow meter 10 for measuring fluid flow in a conduit 26, as shown in FIGS. 6, 7a, 7b and 11. The flow meter 10 comprises multiple transducer pairs 12 positioned to form acoustic transmission paths 14 that are co-located in two or more chordal measurement planes 16. The length of a chordal plane 16 containing the paths 14 being less than 2.5 times the width of the plane 16. In each chordal measurement plane 16 the transducer pairs 12 located in the chordal measurement plane 16 are positioned to form acoustic transmission paths 14 that traverse at least once from one side of the plane 16 to another side of the plane 15. Each transducer 22 or reflection point 28 defines a path node. The number of nodes per chordal plane 16 is equal to or greater than six.

Figure 10A:
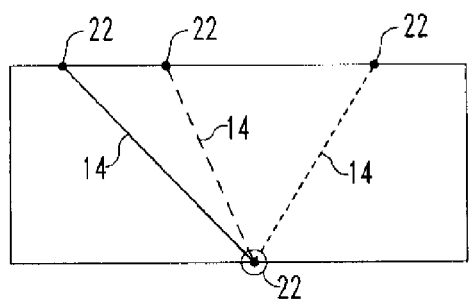
FIGS. 10a-10f show various arrangements of transducers and reflectors where some are shared by two or more paths such that the total number of nodes can be reduced to 5, 4 or 3.
Figure 10B:
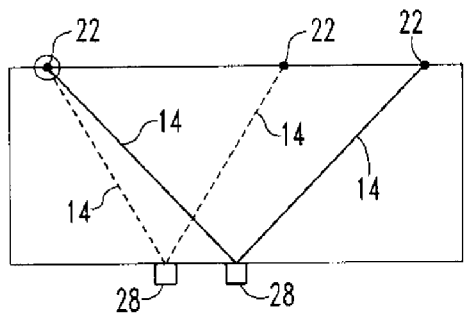
Figure 10C:
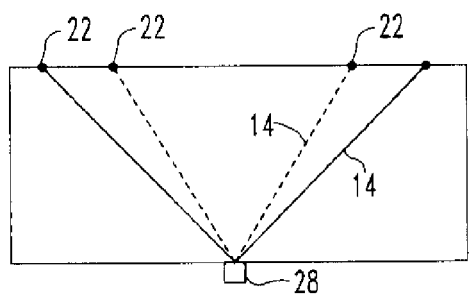

In the case where any node is shared between one or more paths, the total number of nodes can be reduced accordingly. This would apply if a common reflection point 28 it used for more than one path 14, or if a multi-directional transducer 22 is used at the end of two or more paths 14, as shown in FIGS. 10a and 10b. One example would be a chordal plane 16 where three direct paths 14 are formed by using a shared transducer 22 at one side of the plane 16 for one end of each of the three paths 14, and separate transducers 22 at the other side of the plane 16 for the other end of each of the three paths 14, as shown in FIG. 10a. In that case, the number of nodes would be reduced from 6 to 4 as the second and third paths 14 are sharing a node with the first path 14. Another example would be a chordal plane 16 where two reflected paths 14 are formed by using a shared transducer 22 for one end of each of the two paths 14, separate reflectors 28 at the other side of the plane 16, and separate transducers 22 at the other end of each path 14, as shown in FIG. 10b. In that case the number of nodes would be reduced from 6 to 5 as the second path 14 is sharing a node with the first path 14. Yet another example would be a chordal plane 16 where two reflected paths 14 are formed by using four separate transducers 22 for each end of the two paths 14 on one side of the plane 16, and a shared reflector 28 at the other side of the plane 16, as shown in FIG. 10c. In that case the number of nodes would be also reduced from 6 to 5 as the second path 14 is sharing a node with the first path 14.

Figure 10D:
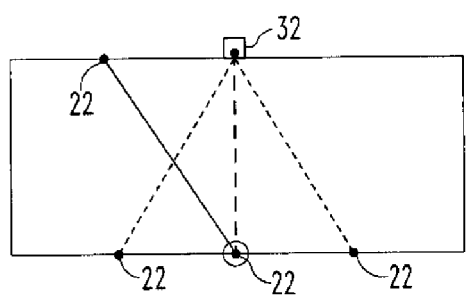

In a case where there are three paths 14 in a chordal plane 16 and transmission on two paths 14 is direct between transducers 22 and one path 14 is a reflected path 14 with two traverses of the chordal plane 16, the number of nodes may be reduced from 7 to 5 if the two direct paths 14 share a transducer node between them at one end and another of the direct path transducers also serves as the reflector for the reflected path, as shown in FIG. 10d.

In another case where there are three paths 14 in a chordal plane 16 and transmission on two paths 14 is direct between transducers 22 and one path 14 is a reflected path 14, the number of nodes may be reduced from 7 to 4 if the two direct paths 14 share a transducer node between them at one end and each share a transducer node at the other side of the plane with one or the other end of the reflected path 14.

Figure 10E:
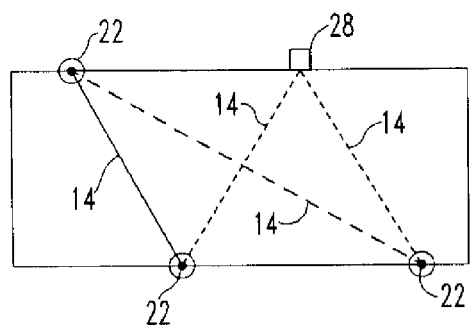

In another case where there are three paths 14 in a chordal plane 16 and transmission on two paths 14 is direct between transducers 22 and one path 14 is a reflected path 14, the number of nodes may be reduced from 7 to 3 if the two direct paths 14 each share a transducer node with the reflected path 14 and a third shared transducer node serves both paths and also serves as the reflector 28 for the reflected path 14, as shown in FIG. 10e.

The present invention pertains to a method for measuring fluid flow in a conduit 26 with an ultrasonic flow meter 10. The method comprises the steps of forming with multiple transducer pairs 12 positioned with respect to the conduit 26 acoustic transmission paths 14 that are co-located in two or more chordal measurement planes 16, each chordal plane having a length to width ratio of less than 2.5. In each chordal measurement plane the transducer pairs 12 located in the chordal measurement plane are positioned to form acoustic transmission paths 14 that traverse at least once from one side 18 of the plane to another side 20 of the plane. If all paths 14 are direct from one transducer 22 to another transducer 22 of a transducer pair a minimum of three traverses is desired in each chordal plane and if any paths 14 employ a point of reflection 28 a minimum of four traverses is desired such that in either case a sum of the number of paths 14 and the number of traverses in each chordal plane is greater than or equal to six. There is the step of determining the fluid flow in the conduit 26 from signals received by the transducers 22 after they have travelled along the paths 14.

The present invention pertains to a self-checking flow meter 10 for determining fluid flow in a conduit 26, as shown in FIGS. 6, 7a, 7b and 11. The flow meter 10 comprises a plurality of transducers 22 engaged with the conduit 26. The flow meter 10 comprises a signal processor 30 in electrical communication with the transducers 22 which causes the transducers 22 to transmit acoustic signals through the flowing fluid or receive flow signals from the transducers 22 based on the transmitted acoustic signals the transducers 22 receive and produces a measurement of flow rate and an associated estimate of uncertainty due to changes that have affected the accuracy of the measured flow rate based on the acoustic signals.

The signal processor 30 may provide verification of axial velocity in each chordal measurement plane of the flow meter 10 for accurate self-verification in the presence of complex non-axial flows including asymmetric rotational flows, and in case of discrepancy provides identification of which chordal measurement planes have contributed to the discrepancy. The transducers 22 are arranged such that two or more measurements of axial velocity can be made in each chordal measurement plane of the flow meter 10 so the two or more in-plane axial measurements made in each chordal measurement plane are substantially independent of the effects of non-axial or transverse flow. For this to work effectively, all paths must be closely spaced in order that rotation and development of the flow in the axial direction does not have a significant effect. In other words, if the paths are separated by too great a distance, the velocity profile and swirl pattern at separate paths in the same chordal plane will be different and it cannot be assumed that the axial and transverse components of velocity are the same at each path in the chordal plane. Therefore, the paths should preferably overlap or the length of the chordal plane should be less than 2.5 times its width.

The signal processor 30 may detect path angle and path length changes that would result from contamination build up inside the flow meter 10, and does this for each chordal measurement plane without reference to data from another chordal measurement plane. The transducers 22 may form multiple transducer pairs 12 positioned to form acoustic transmission paths 14 that are co-located in two or more chordal measurement planes 16, in each chordal measurement plane the transducer pairs 12 located in the chordal measurement plane are positioned to form acoustic transmission paths 14 that traverse at least once from one side 18 of the plane to another side 20 of the plane, if all paths 14 are direct from one transducer 22 to another transducer 22 of a transducer pair, a minimum of three traverses is desired in each chordal plane and if any paths 14 employ a point of reflection 28, a minimum of four traverses is desired such that in either case a sum of the number of paths 14 and the number of traverses in each chordal plane is greater than or equal to six.

Figure 4:
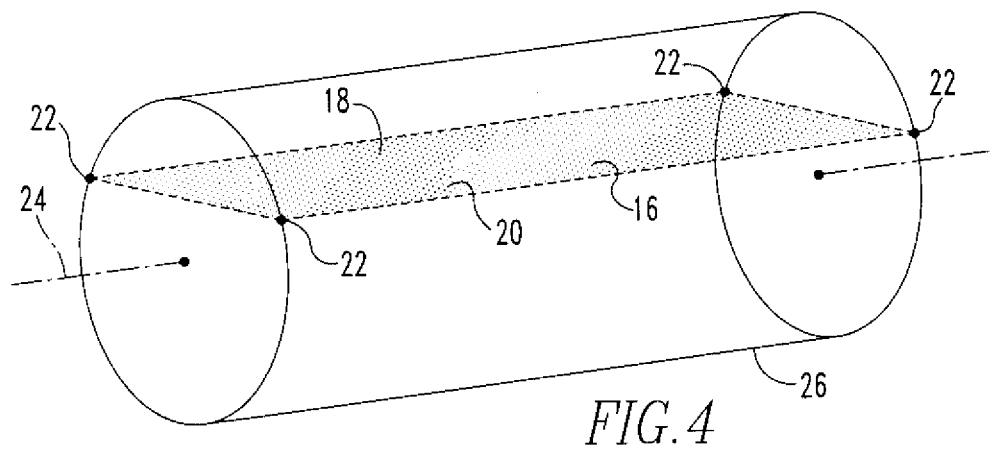
FIG. 4 is an illustration of a single chordal measurement plane of the present invention.

The measurement system of the invention comprises a section of conduit 26 housing multiple ultrasonic transducers 22, each transducer 22 being used in conjunction with at least one other transducer 22 in order to measurements of ultrasonic transit time along paths 14 inside the conduit. Transducers 22 are positioned such that all of the paths 14 fall in a number of discrete chordal measurement planes 16. In this context a chordal measurement plane is a plane that intersects two points on the boundary of the conduit, is parallel with the central axis 24 of the conduit, and has a length to width ratio of less than 2.5 as shown in FIG. 4.

Either direct or reflected paths 14 can be used or a combination of both. In a direct path the ultrasonic signals travel between transducers 22 without a change of direction via a reflection point. In a reflected path, the path is made up of two or more traverses of the interior of the conduit 26 by means of reflection. Reflected paths may require installation of a reflector at the intersection with the conduit or may use the conduit 26 wall as a reflector. A direct path therefore includes only one traverse across the chordal measurement plane, whereas a reflected path includes multiple traverses. The current invention differs from prior art in that the transit time measurements are used to obtain at least two values of axial velocity for each chordal measurement plane, derived in such a manner that each axial velocity value is substantially immune to any velocity component transverse to the plane. This imposes certain conditions on the configuration of paths 14 in each chordal measurement plane. In terms of the number of paths 14 and traverses desired in each chordal plane, the minimum requirement is for two paths of two traverses each if only reflected paths 14 are used. Three or more paths and three or more traverses are desired if any direct paths are used.

Figure 5A:
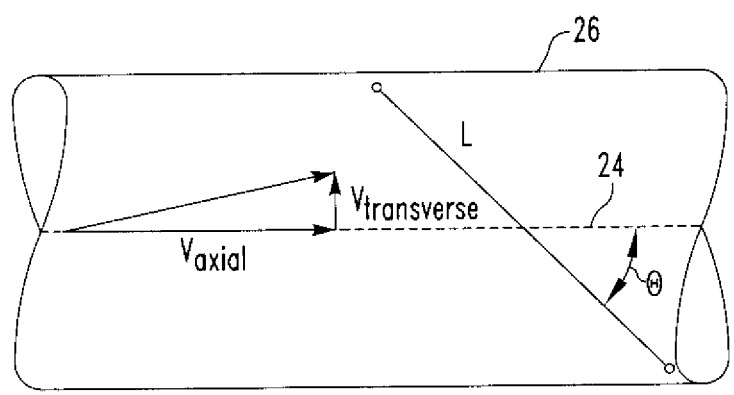
FIGS. 5a and 5b are illustrations of the transit time measurement principle with axial and transverse velocity components shown.
Figure 5B:
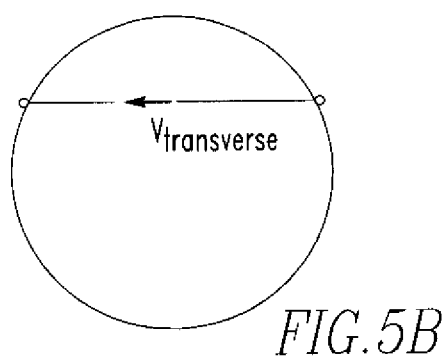

With reference to FIGS. 5a and 5b, it can be shown with certain assumptions that the transit time associated with a single traverse of an ultrasonic path can be represented as follows:

$$t_{up} = \frac{L}{c - v_{axial}\cos\theta - v_{transverse}\sin\theta}$$

$$t_{down} = \frac{L}{c + v_{axial}\cos\theta + v_{transverse}\sin\theta}$$

Where L is the length of the traverse, c is the sound velocity, $v_{axial}$ is the velocity component in the axial direction, $v_{transverse}$ is the velocity component at 90 degrees to the axial direction in the chordal measurement plane and $\theta$ is the effective path angle. Introducing a calculated velocity term v for an individual path we can write:

$$v = \frac{L(t_{up} - t_{down})}{2\cos\theta t_{up} t_{down}} = v_{axial} + v_{trasverse}\tan\theta = v_{axial} + \frac{X}{Z}v_{transverse}$$

Now, using an example of three direct paths as shown in FIG. 6, it can be written, $$v_A = v_{axial} + \frac{X_A}{Z_A}v_{transverse}$$

$$v_B = v_{axial} + \frac{X_B}{Z_B}v_{transverse}$$

$$v_C = v_{axial} + \frac{X_C}{Z_C}v_{transverse}$$

Where X and Z are the projected path lengths on the cross-sectional and axial planes and the subscripts refer to paths A, B and C respectively.

With a system of two simultaneous equations and two unknowns, it is possible to solve for the two unknowns. In this case, there are three equations and therefore we can obtain $v_{axial}$ and $v_{transverse}$ for that particular chordal plane from multiple combinations of the data. For example, if $v_{axialAB}$ is denoted to represent the axial velocity calculated using the measurements from paths A and B, and $v_{axialBC}$ to represent the axial velocity calculated using the measurements of paths B and C, then the above equations can be solved as follows:

$$v_{axialAB} = \frac{\left(v_B - v_A \frac{Z_A X_B}{X_A Z_B}\right)}{\left(1 - \frac{Z_A X_B}{X_A Z_B}\right)}$$

$$v_{axialBC} = \frac{\left(v_C - v_B \dfrac{Z_B X_C}{X_B Z_C}\right)}{\left(1 - \dfrac{Z_B X_C}{X_B Z_C}\right)}$$

This gives us two measures of axial velocity in that particular chordal measurement plane (which we call 'in-plane axial' velocities), both of which are independent of the transverse velocity in the plane. This means that any difference between the calculated values of in-plane axial velocity will highlight errors in either the transit time measurement terms or the geometric terms of the equation, and will not be affected by transverse flow. Note that in this particular example, a third axial in-plane velocity $v_{axialAC}$ can also be calculated.

Similar outcomes can also be obtained for more complex assumptions including adaptations to include practical issues such as recessed transducers and the inclusion of time delay corrections. Furthermore, a similar treatment can be carried out for reflected paths, where cancelation of transverse flow can be effected within individual paths.

Calculation of the axial velocity in each plane now proceeds as follows:

$$v_{plane_i} = f_1(v_{axialAB}, v_{axialBC}, v_{axialAC}, \text{etc})$$

Where $f_1$ represents a function used to combine the measurements, i.e. an axial velocity for a chordal measurement plane i is derived from all of the in-plane axial velocity measurements obtained for in that particular plane, and hence uses all of the measurements from the paths 14 that lie in that plane. One preferred method of combining the in-plane axial velocities is performing a simple average. However, more complex methods could be used, such as applying weighting factors to each of the in-plane axial velocities or selecting just one of the path combinations to use, without departing from the spirit of the invention.

Flowrate is then calculated by combining together the axial velocity measurement from each of the measurement planes 16 (which we will now call the 'plane velocities'), along with any desired geometric and/or calibration factors, e.g.

$$Q = k_h k_g f_2(v_{plane_1}, \ldots, v_{plane_n})$$

Where $k_h$ represents a hydraulic correction factor, $k_g$ represents a geometric factor, and $f_2$ represents the scheme used to combine the axial velocity measurements in order to obtain a representative mean. This could involve, for example, schemes such as Gaussian quadrature, where the measurement planes 16 are positioned parallel to one another at locations predetermined by the number of planes 16 and the plane velocities are then weighted accordingly, e.g.

$$Q = k_h k_g \sum_{i=1}^{n} w_i v_{plane_i}$$

Alternatively, empirical or model based combination of the plane velocities could be used.

For determination of the uncertainty due to changes that could have affected the accuracy of the measurement system, the difference between in-plane axial velocities is calculated for each measurement plane. Using again the example of three direct paths 14 per plane it is possible to calculate three difference values for the in-plane axial velocities, e.g.

$$\Delta_{AB-AC} = v_{axialAB} - v_{axialAC}$$

$$\Delta_{AV-BC} = v_{axialAB} - v_{axialBC}$$

$$\Delta_{AC-BC} = v_{axialAC} - v_{axialBC}$$

The uncertainty in the plane velocity would hence be functionally related to the difference values:

$$u_{plane_i} = f_3(\Delta_{AB-AC}, \Delta_{AB-BC}, \Delta_{AC-BC})$$

Alternatively, instead of using difference values, alternative computational method could be applied, for example, the ratios of the in-plane axial velocities or a standard deviation could be used as the input to the uncertainty estimation.

The estimation of uncertainty can easily be illustrated by example. In this simple example the axial velocity in the measurement plane is calculated using three direct paths 14, at angles of 75, 60 and 45 degrees. Note that this represents only one plane of the meter 10, the results of which would later be combined with the other planes 16 to determine the flow rate and overall uncertainty. The following parameters are used in the calculation for this example:

Axial velocity in the measurement plane: 10 m/s
Transverse velocity in the measurement plane: 1 m/s
Speed of sound in the fluid: 1500 m/s
Width of measurement plane: 0.1 m Table 1 below illustrates the measurement results in the case of a system operating with no errors. The in-plane axial velocities are calculated from three separate combinations of paths A, B and C. As there are no errors present, and the transverse velocity is eliminated in the calculation of the in-plane velocities, the three results for combinations AB, BC and AC are the same, and hence when we compare them against the other, the calculated deltas are zero, as is the error in the plane velocity.

TABLE 1

| | | Individual paths | | |
| --- | --- | --- | --- | --- |
| | | A | B | C |
| Angle | (degrees) | 75 | 60 | 45 |
| X | (m) | 0.100 | 0.100 | 0.100 |
| Z | (m) | 0.027 | 0.058 | 0.100 |
| Error in tup | (ns) | 0 | 0 | 0 |
| tup | (ns) | 69182.33 | 77282.26 | 94772.34 |
| tdown | (ns) | 68855.27 | 76680.16 | 93794.54 |

| In-plane axial velocities | | | Plane velocity | |
| --- | --- | --- | --- | --- |
| AB (m/s) | AC (m/s) | CB (m/s) | Average (m/s) | Error (%) |
| 10.00 | 10.00 | 10.00 | 10.00 | 0.00% |

| Absolute deltas | | | |
| --- | --- | --- | --- |
| AB vs AC | AB vs BC | AC vs BC | Maximum |
| 0.00% | 0.00% | 0.00% | 0.00% |

Now an error of 2 nanoseconds can be introduced into the upstream transit time measurement (tup) on path A. As shown in Table 2, now when the in-plane axial velocities, AB, AC and BC are computed, three different results are obtained. It is also found that there is now an error in the plane velocity result. Examining the deltas when we compare our in-plane axial velocity measurements, we find that for this particular case the maximum deviation (AB vs BC) has a magnitude that is twice the error in the average axial velocity. Hence, there is a measured deviation that can be directly related to the uncertainty by means of a sensitivity coefficient.

TABLE 2

| Individual paths | | | | | |
|---|---|---|---|---|---|
| | | A | B | C | |
| Angle | (degrees) | 75 | 60 | 45 | |
| X | (m) | 0.100 | 0.100 | 0.100 | |
| Z | (m) | 0.027 | 0.058 | 0.100 | |
| Error in tup | (ns) | 2 | 0 | 0 | |
| tup | (ns) | 69184.33 | 77282.26 | 94772.34 | |
| tdown | (ns) | 68855.27 | 76680.16 | 93794.54 | |

| In-plane axial velocities | | | Plane velocity | |
|---|---|---|---|---|
| AB (m/s) | AC (m/s) | CB (m/s) | Average (m/s) | Error (%) |
| 9.93 | 9.97 | 10.00 | 9.97 | −0.34% |

| Absolute deltas | | | |
|---|---|---|---|
| AB vs AC | AB vs BC | AC vs BC | Maximum |
| 0.42% | 0.72% | 0.31% | 0.72% |

In general, the delta values will exceed the error in the plane velocity, as a result of the plane velocity being calculated from multiple in-plane axial velocities. However, under some circumstances, if more than one error is present, it is possible that they can combine in a way that alters the sensitivity coefficient. To provide additional information and some protection against such circumstances, in-plane transverse velocities can also be calculated, compared and used in the uncertainty estimation. Following on from the earlier parts of the description, transverse velocities can be calculated as follows:

$$v_{transverseAB} = \frac{(v_B - v_A)Z_A Z_B}{(Z_A X_B - Z_B X_A)}$$

The technique developed here can be implemented in many different ways by someone skilled in the art. The following descriptions cover just some of the possible implementations:

In the implementation shown in FIGS. 7a and 7b, a chordal plane contains two paths 14, each of which has a single reflection and two traverses. Different angles have been selected for each path so as to allow detection of common-mode errors according to the invention. In this configuration, each path delivers an in-plane axial velocity measurement directly. Therefore, the comparison of the two paths 14 to determine the uncertainty in that measurement plane serves the purpose of the invention in this case. As each reflected path cancels the contribution to the measurement of non-axial component of flow, one relative disadvantage of this particular configuration is that no measurements of non-axial flow are available to compliment the analysis of the axial velocities.

Figure 8A:
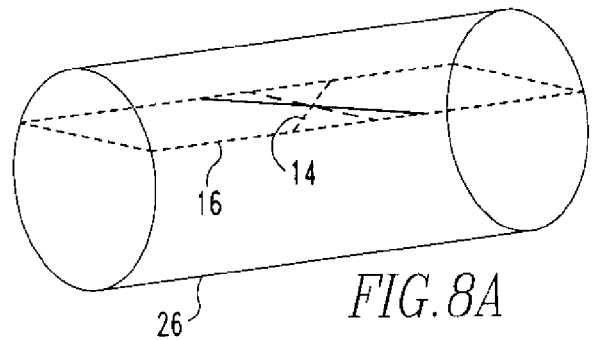
FIGS. 8a and 8b show an arrangement of transducers forming direct paths in one chordal plane according to one preferred embodiment of the invention.
Figure 8B:
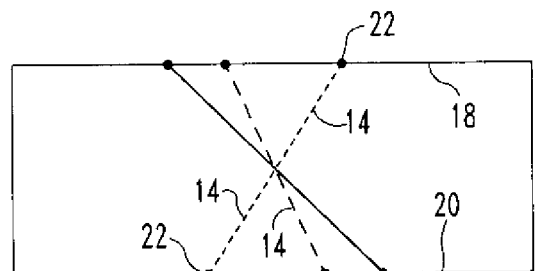

In the implementation shown in FIGS. 8a and 8b, the chordal plane contains three direct single-traverse paths, with no reflections. Again, different path angles have been selected for these paths so as to allow detection of common-mode errors. With this configuration, any pair of paths 14 can be combined to yield both an axial and a non-axial flow velocity, which in an advantage when compared with the embodiment of FIGS. 7a and 7b and hence the arrangement in FIGS. 8a and 8b is preferred.

FIGS. 9a and 9b show a combination of reflected and direct paths in one chordal plane. In this case there are two direct paths and one reflected path. The two direct paths can be combined to give one measure of the in-plane axial velocity and the reflected path will yield another. Yet again, the use of different path angles and path lengths will facilitate detection of common-mode errors.

In each of the preceding examples, a minimum of two measures of in-plane axial velocity are derived that are substantially independent of the transverse flow velocity. In order for this to be achieved, a chordal plane should contain an arrangement of paths 14 where the sum of the number of traverses plus the number of paths 14 is equal to or greater than 6. For example, in FIGS. 7a and 7b, there are two paths each with two traverses so the so the sum of traverses plus paths equals six. Likewise in FIGS. 8a and 8b there are three paths each of which are a single traverse, so the sum of traverses plus paths equals six. More complex arrangements involving direct and reflected paths, or multiple reflections are also possible without departing from the spirit of the invention. In FIGS. 9a and 9b, there are three paths, two of which have a single traverse and one of which has two traverses, so the sum of traverses plus paths in that case is seven.

An alternative way of describing the same constraint is to consider each transducer 22 or reflection point 28 as a node in the chordal plane. In that case, FIGS. 7 and 8 show arrangements with six nodes each, and FIG. 9 shows an arrangement of seven nodes, therefore the minimum number of nodes per chordal plane is six. Arrangements with more than seven nodes are conceivable but add cost and complexity to little gain.

Figure 10F:
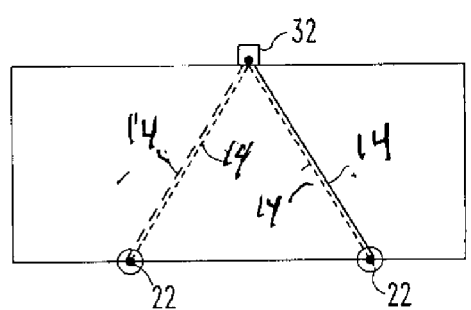

FIGS. 10a-10f show various arrangements of 22 and reflectors 28 where some are shared by two or more paths such that the total number of nodes can be reduced to 5, 4 or 3. FIG. 10a shows three direct paths 14 in a single chordal plane 16 with one transducer 22 that is shared by all three paths 14, reducing the number of nodes required from 6 to 4. FIG. 10b shows two reflected paths 14 with one transducer 22 that is shared by both paths 14, reducing the number of nodes required from 6 to 5. FIG. 10c shows two reflected paths 14 with a reflector 28 that is shared by both paths 14, reducing the number of nodes required from 6 to 5. FIG. 10d shows two direct paths 14 and one reflected path 14 with one transducer 22 that is shared by two paths 14 and with a combined transducer/reflector 32 that is another shared node, reducing the number of nodes required from 7 to 5. FIG. 10e shows two direct paths 14 and one reflected path 14 with three transducers 22 that are each shared by two paths 14, reducing the number of nodes required from 7 to 3. FIG. 10f shows two direct paths 14 and one reflected path 14 with two transducers 14 that are each shared by two paths 14 and a combined transducer/reflector 32 that is a node that is shared by all three paths 14, reducing the number of nodes required from 7 to 3.

A second example follows in which the in-plane axial velocities are compared in order to detect a uniform buildup of contamination on the face all transducers 22 in a single chordal plane. In this example we are considering a chordal plane situated at a distance of 0.809 times the radius of a circular conduit of 16 inches in diameter. Similar to the earlier numerical example, this example uses direct paths only. The path angles selected were 45, 65 and −55 degrees and the path lengths were chosen such that the transducers 22 would be slightly recessed relative to the internal diameter of the conduit. A velocity of sound value of 1380 m/s was assumed for the liquid, and 2200 m/s was assumed for the contaminant, representing a thin layer of hydrocarbon wax.

By simulation, the sensitivity factor relating the difference between the calculated in-plane velocities and the measurement error was determined in advance as a function of the measured transverse flow. Table 3 below shows the results when the axial flow velocity is 5 m/s, the transverse flow is zero and there are no measurement errors or contamination build-up. In this table it can be seen that all three in-plane axial velocity measurements agree and hence the estimated uncertainty is zero.

TABLE 3

| Path velocities | |
|---|---|
| Path A | 5.000 m/s |
| Path B | 5.000 m/s |
| Path C | 5.000 m/s |
| In-plane axial velocties | |
| AB | 5.000 m/s |
| BC | 5.000 m/s |
| AC | 5.000 m/s |
| Measured (average) axial velocity | 5.000 m/s |
| Acual error | 0.00% |
| Transverse flow | 0% |
| Difference max from min | 0.000 m/s |
| Sensitivity factor | 2.1011 |
| Estimated uncertainty | 0.00% |

Table 4 shows the results when the axial flow velocity is 5 m/s, the transverse flow is zero and there is a wax buildup of 0.02 inches on each transducer 22 face. It can be observed that the velocity measurement in that chordal plane would be in error by 0.2% and that the difference between the in-plane velocity measurements can be used to predict an increased uncertainty of 0.19%.

TABLE 4

| Path velocities | |
|---|---|
| Path A | 5.010 m/s |
| Path B | 5.011 m/s |
| Path C | 5.013 m/s |
| In-plane axial velocties | |
| AB | 5.010 m/s |
| BC | 5.012 m/s |
| AC | 5.007 m/s |
| Measured (average) axial velocity | 5.010 m/s |
| Acual error | 0.20% |
| Transverse flow | 0% |
| Difference max from min | 0.005 m/s |
| Sensitivity factor | 2.1006 |
| Estimated uncertainty | 0.19% |

Table 5 shows the results when the axial flow velocity is 5 m/s, the transverse flow is 1 m/s and there are no measurement errors or contamination build-up. It can be observed that taken individually the indicated velocities on individual paths (A, B and C) differ owing to the transverse flow, and that looking at these three measurements it would be difficult to determine whether or not an error is present, but that when the in-plane velocities are calculated from path combinations AB, BC and AC, the three results agree, and the analysis results in an estimate of zero additional uncertainty.

TABLE 5

| Path velocities | |
|---|---|
| Path A | 6.000 m/s |
| Path B | 3.572 m/s |
| Path C | 7.145 m/s |

TABLE 5-continued

| In-plane axial velocties | |
|---|---|
| AB | 5.000 m/s |
| BC | 5.000 m/s |
| AC | 5.000 m/s |
| Measured (average) axial velocity | 5.000 m/s |
| Acual error | 0.00% |
| Transverse flow | 20% |
| Difference max from min | 0.000 m/s |
| Sensitivity factor | 1.5891 |
| Estimated uncertainty | 0.00% |

Table 6 shows the results when the axial flow velocity is 5 m/s, the transverse flow is 1 m/s and there is a wax buildup of 0.02 inches on each transducer 22 face. It can be observed that, taken individually, the indicated velocities on individual paths (A, B and C) differ owing to the combined effects of transverse flow and the wax build up and that looking at these three measurements it would be difficult to determine whether or not an error is present. However, when the in-plane velocities are calculated from path combinations AB, BC and AC and compared, the three results do not agree exactly, and the uncertainty analysis results in an estimate of 0.19% additional uncertainty. It can also be observed, that the sensitivity factor, is different in tables 4 and 6, as this parameter is adjusted as a function of the measured transverse flow to maintain the correct relationship between the measured difference between the in-plane velocities and the corresponding measurement uncertainty.

TABLE 6

| Path velocities | |
|---|---|
| Path A | 6.012 m/s |
| Path B | 3.580 m/s |
| Path C | 7.162 m/s |
| In-plane axial velocties | |
| AB | 5.010 m/s |
| BC | 5.012 m/s |
| AC | 5.006 m/s |
| Measured (average) axial velocity | 5.009 m/s |
| Acual error | 0.19% |
| Transverse flow | 20% |
| Difference max from min | 0.006 m/s |
| Sensitivity factor | 1.5885 |
| Estimated uncertainty | 0.19% |

In practice, the invention will most likely be implemented in high-accuracy meter designs that would employ the invention in multiple chordal planes 16, such as the arrangement of four chordal planes 16, with three paths in each shown in FIG. 11. While this illustration shows the same embodiment of the invention being used in each plane (i.e. three direct paths), it is also possible that different combinations could be used, such as the arrangement of FIG. 7 being used in one plane and the arrangement of FIG. 8 being used in another.

NOMENCLATURE

Chordal plane 16: A plane that intersects two points on the boundary of a conduit and extends in a direction that is parallel with the central axis 24 of the conduit.

Path 14: Intended route of ultrasound transmission through the fluid between two transducers.

Chordal path: Any path that is confined to a single chordal plane.

Direct path: A path where the intended route of transmission is directly between two transducers and does not involve a change of direction by means of reflection.

Reflected path: A path where the intended route of transmission connects two transducers via one or more reflection points. The reflection point could either be the conduit wall itself, or a reflector designed to redirect the path partway along the route of transmission.

Traverse: A straight segment of a chordal path between any two points, either two transducers, two reflectors, or one transducer and one reflector. A direct path has only one traverse, a path with one refection has two traverses, and a path with two reflections has three traverses.

Node: A transducer site or reflection point that defines one end of a traverse.\

In-plane axial velocity: A measure of axial velocity that involves use of two or more traverses in a single chordal plane in order to obtain a velocity measurement that is substantially independent of any transverse flow component in that plane.

Axial velocity: The component of flow velocity in a direction parallel with the central axis 24 of the conduit.

Transverse velocity: The component of flow velocity at 90 degrees to the axial direction in the chordal measurement plane.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An ultrasonic flow meter for measuring fluid flow in a conduit having a conduit axis comprising:

multiple transducer pairs positioned to form acoustic transmission paths that are co-located in two or more chordal measurement planes, in each chordal measurement plane the multiple transducer pairs located in the chordal measurement plane are positioned to form acoustic transmission paths that traverse at least once from one side of the plane to another side of the plane, each traverse is either direct from one transducer to another or via one or more reflection points, the length of separation between any two transducers or reflection points in a direction aligned with the conduit axis being less than 2.5 times the length of the separation between any two transducers or reflection points in a direction perpendicular to the conduit axis, if all paths are direct from one transducer to another transducer of a transducer pair there is a minimum of three traverses in each chordal plane and if any paths employ a point of reflection there is a minimum of four traverses such that in either case a sum of the number of paths and the number of traverses in each chordal plane is equal to or greater than six and whereby a plurality of axial velocity measurements are made in each chordal plane.

2. The ultrasonic flow meter of claim 1 having three direct paths per chordal plane wherein a first pair of paths are used in the computation of an axial velocity measurement in the chordal plane, and a second axial velocity measurement in the chordal plane is made using one of the first pair of paths and a third path such that the second pair of paths is defined as one of the first pair of paths and the third path or another one of the first pair of paths and the third path.

3. The ultrasonic flow meter of claim 1 having three direct paths per chordal plane wherein two axial velocity measurements are made in each plane according to equations:

$$v_{axialAB} = \frac{\left(v_B - v_A \frac{Z_A X_B}{X_A Z_B}\right)}{\left(1 - \frac{Z_A X_B}{X_A Z_B}\right)}$$

$$v_{axialBC} = \frac{\left(v_C - v_B \frac{Z_B X_C}{X_B Z_C}\right)}{\left(1 - \frac{Z_B X_C}{X_B Z_C}\right)}$$

4. The ultrasonic flow meter of claim 1, whereby a multi-directional transducer is used such that two or more paths have a beginning or end that is a shared transducer.

5. The ultrasonic flow meter of claim 1, whereby a reflection point is common to two or more paths.

6. The ultrasonic flow meter of claim 1, whereby a transducer also serves as a reflection point for another path.

7. An ultrasonic flow meter for measuring fluid flow in a conduit having a conduit axis comprising:

multiple transducer pairs positioned to form acoustic transmission paths that are co-located in two or more chordal measurement planes in each chordal measurement plane the multiple transducer pairs located in the chordal measurement plane are positioned to form acoustic transmission paths that traverse at least once from one side of the plane to another side of the plane, each transducer or reflection point defines a path node, the length of separation between any two nodes in a direction aligned with the conduit axis being less than 2.5 times the length of the separation between any two nodes in a direction perpendicular to the conduit axis, a number of nodes per chordal plane is equal to or greater than six and whereby a plurality of axial velocity measurements are made in each chordal plane.

8. The ultrasonic flow meter of claim 7 having three paths per chordal plane and transmission is on a direct path between individual transducers.

9. The ultrasonic flow meter of claim 7 having two paths per chordal plane, each path being a reflected path with two traverses of the chordal plane and one reflection in each of the two paths.

10. The ultrasonic flow meter of claim 7 having three paths per chordal plane and transmission on two paths is direct between transducers, and one path is a reflected path with two traverses of the chordal plane and one reflection point.

11. The ultrasonic meter of claim 7 wherein there are no shared nodes and there are only 6 or 7 nodes.

12. The ultrasonic meter of claim 7 wherein one node is shared by two paths and the total number of nodes can be reduced from six to five.

13. The ultrasonic meter of claim 7 wherein one node is shared by three paths and the total number of nodes can be reduced from six to four.

14. The ultrasonic meter of claim 7 wherein two nodes are each shared by two paths and the total number of nodes can be reduced from six to four or from seven to five.

15. The ultrasonic meter of claim 7 wherein three nodes are each shared by two paths and the total number of nodes can be reduced from seven to four.

16. The ultrasonic meter of claim 7 wherein two nodes are each shared by two paths and a third node is shared by three paths and the total number of nodes can be reduced from seven to three.

17. The ultrasonic flowmeter of claim 7 wherein the paths in each chordal plane overlap.

18. A method for measuring fluid flow in a conduit with an ultrasonic flow meter comprising the steps of:
- forming with multiple transducer pairs positioned with respect to the conduit, acoustic transmission paths that are co-located in two or more chordal measurement planes, in each chordal measurement plane, the multiple transducer pairs located in the chordal measurement plane are positioned to form acoustic transmission paths that traverse at least once from one side of the plane to another side of the plane, if all paths are direct from one transducer to another transducer of a transducer pair, there is a minimum of three traverses in each chordal plane and if any paths employ a point of reflection, there is a minimum of four traverses such that in either case a sum of the number of paths and the number of traverses in each chordal plane is greater than or equal to six and whereby two axial velocity measurements are made in each plane,
- wherein, each traverse is either direct from one transducer to another or via one or more reflection points, the length of separation between any two transducers or reflection points in a direction aligned with the conduit axis being less than 2.5 times the length of the separation between any two transducers or reflection points in a direction perpendicular to the conduit axis; and
- determining the fluid flow in the conduit from signals received by the transducers from the paths.

\* \* \* \* \*